(12) United States Patent
Kasuya

(10) Patent No.: US 8,533,492 B2
(45) Date of Patent: Sep. 10, 2013

(54) ELECTRONIC DEVICE, KEY GENERATION PROGRAM, RECORDING MEDIUM, AND KEY GENERATION METHOD

(75) Inventor: Tomomi Kasuya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/319,550

(22) PCT Filed: May 22, 2009

(86) PCT No.: PCT/JP2009/059402
§ 371 (c)(1),
(2), (4) Date: Nov. 9, 2011

(87) PCT Pub. No.: WO2010/134192
PCT Pub. Date: Nov. 25, 2010

(65) Prior Publication Data
US 2012/0066515 A1 Mar. 15, 2012

(51) Int. Cl.
*G06F 11/30* (2006.01)
(52) U.S. Cl.
USPC .............................. 713/189; 713/194; 726/26
(58) Field of Classification Search
None
See application file for complete search history.

(56) References Cited

U.S. PATENT DOCUMENTS

| | | | |
|---|---|---|---|
| 2004/0243814 A1 * | 12/2004 | Nakano et al. | 713/189 |
| 2006/0161773 A1 | 7/2006 | Okazaki et al. | |
| 2010/0031065 A1 | 2/2010 | Futa et al. | |
| 2010/0058478 A1 * | 3/2010 | Shetty et al. | 726/26 |

FOREIGN PATENT DOCUMENTS

| | | |
|---|---|---|
| JP | 2001 096040 | 4/2001 |
| JP | 2003-108257 | 11/2003 |
| JP | 2004 143889 | 5/2004 |
| JP | 2004-534992 | 11/2004 |
| JP | 2005 084989 | 3/2005 |
| JP | 2005 292902 | 10/2005 |
| JP | 2006 203564 | 8/2006 |
| JP | 2008 056612 | 5/2008 |
| WO | WO 2006038183 A1 * | 4/2006 |

OTHER PUBLICATIONS

Tuyls, P., et al., "Read-Proof Hardware from Protective Coatings," Proceedings of Cryptographic Hardware and Embedded Systems (CHES 2006), pp. 1-15, (2006).

(Continued)

*Primary Examiner* — Andrew L Nalven
*Assistant Examiner* — Mohammed Waliullah
(74) *Attorney, Agent, or Firm* — Oblon, Spivak, McClelland, Maier & Neustadt, L.L.P.

(57) ABSTRACT

An electronic device 100 executes a key-using process that uses a key. A physical quantity generation part 190 generates a physical quantity intrinsic to the electronic device and having a value which is different from one electronic device to another and different each time the physical quantity is generated. A key generation part 140 generates the same key for each key-using process, based on the physical quantity generated by the physical quantity generation part 190, each time the key-using process is to be executed, immediately before the key-using process is started. A key-using process execution part 1010 executes the key-using process such as generation of a keyed hash value, by using the key generated by the key generation part 140. A control program execution part 180 deletes the key generated by the key generation part 140, each time the key-using process is ended.

8 Claims, 13 Drawing Sheets

(56) References Cited

OTHER PUBLICATIONS

Guajardo, J., et al., "FPGA Intrinsic PUFs and Their Use for IP Protection," P. Paillier and I. Verbauwhede (Eds.): CHES 2007, LNCS 4727, pp. 63-80, (2007).

International Search Report Issued Jun. 23, 2009 in PCT/JP09/059402 Filed May 22, 2009.
Office Action issued May 14, 2013 in Japanese Patent Application No. 2011-514263 with partial English translation.

* cited by examiner

ELECTRONIC DEVICE, KEY GENERATION PROGRAM, RECORDING MEDIUM, AND KEY GENERATION METHOD

TECHNICAL FIELD

The present invention relates to an apparatus having a function of detecting copying or illegal modification of a program or parameter incorporated in an electronic device.

BACKGROUND ART

An electronic device having built-in software or a built-in parameter is generally called a built-in device or built-in system. The built-in device is located at the center of a home electric appliance, an automobile, a railroad system, a factory manufacture facility, or the like, to supervise control over it. Along with the recent trend for a mobile device and an information oriented society, a built-in device is more and more connected to a network and becoming multifunctional and large-scaled rapidly, to support the basic system of the society. Also, the application field of the built-in device expands rapidly. As the result of these changes of the circumstances, demands for the security of the built-in device increase rapidly.

If the built-in device is connected to the network, it is exposed to a threat via the network. Also, the built-in device is exposed to a threat of illegal extraction or illegal modification of loaded software and parameter by the owner of the built-in device. This is a feature of the built-in device. If the program or parameter of an electronic device (built-in device) is tampered illegally, the electronic device exhibits a behavior not intended by the manufacturer. As a result, the operation amount of the hardware exceeds the tolerance limit. In this manner, tampering affects the reliability and security of an electronic device largely and adversely. Often, most of the functions of the built-in device are realized by the incorporated software and parameter. The contents of such programs may undesirably leak by reverse engineering or the like.

As a protection against illegal modification (tampering) or copying of built-in software or parameters of an electronic device, or leak of the contents of the built-in software or parameters (extraction of the programs and parameters), conventionally, the following methods have been employed:
(1) A keyed hash value or the like is used as a check code (tampering prevention).
(2) Software or a parameter is encrypted and stored in the electronic device, and is decrypted at the time of execution (prevention against tampering and extraction).

With either method, the keyed hash value, or a key used in an encryption process/decryption process, must be stored in or outside the device. If the device is analyzed or key information leaks, the countermeasures of (1) and (2) may be invalidated.

A conventional check code method will be described with reference to FIGS. 8 to 11. FIGS. 8 and 9 are block diagrams of a conventional electronic device 10. FIGS. 10 and 11 are operation flowcharts. FIGS. 8 and 9 are for describing tampering detection and copy prevention of a program and parameter in the electronic device by using a check code 13 based on a keyed hash value, or by using an encryption process. Tampering detection using the check code 13 based on the keyed hash value is conducted in accordance with the following procedure (FIG. 10).

A control program 12 for the electronic device 10 is stored in a nonvolatile memory 11. A keyed hash value H0 is calculated from the control program 12 and a check code generating key (S01), and is written in the nonvolatile memory 11 as the check code 13 (S02). Although the check code generating key is stored in the electronic device 10, it may be input externally via an I/O 14 instead. These steps are conducted in a secure environment in advance, e.g., before shipment from the factory.

Subsequently, a CPU 16 executes the following process. The CPU 16 checks if the control program 12 in the electronic device 10 is not tampered. As shown in FIG. 9, the CPU 16 calculates a keyed hash value H1 using the control program 12 and the check code generating key after the power supply is turned on, or at an arbitrary timing (S11). The check code generating key may be stored in the electronic device 10 in advance, or input externally via the I/O 14. The CPU 16 compares the calculated keyed hash value H1 with the check code 13 stored in the nonvolatile memory 11 (S12). As the result of comparison, if a coincidence is established, it indicates that the control program 12 is not tampered. The CPU 16 executes the control program 12, and accordingly the electronic device 10 operates normally (S13). If a coincidence is not established, it indicates that the control program 12 is tampered. The CPU 16 performs a necessary process, e.g., stopping operation of the electronic device 10, or producing an alarm (S14).

Tampering detection using the check code 13 based on the keyed hash value, as well as copy prevention of the control program 12 by employing encryption and decryption processes, will be described with reference to FIG. 11. The tampering detection method is the same as that described above. The copy prevention is performed in accordance with the following procedure.

The control program 12 in the nonvolatile memory 11 is stored through the encryption process using a cipher key K1. At this time, the encrypted control program 12 (an encrypted program 12a) is overwritten on the control program 12. Hence, the control program 12 itself no longer exists in the electronic device 10 (S21). The cipher key used in the encryption process may be stored in the electronic device 10 in advance, or externally input via the I/O 14, in the same manner as the check code generating key. The steps so far are conducted in a secure environment in advance, e.g., before shipment from the factory.

When operating the electronic device 10, the CPU 16 decrypts the encrypted control program 12a into the original control program 12 by using the decryption key (S22), and executes the control program 12, thereby controlling the electronic device 10. The decryption key employed at this time may be stored in the electronic device 10 in advance, or eternally input via the I/O 14. By conducting these steps, the control program 12 is stored in the electronic device 10, usually in an encrypted state. This makes it difficult to copy the control program 12, unless the cipher key or decryption key has been obtained.

As another prior art "A Game Machine and a Verification Apparatus" described in Japanese Patent Publication No. 2001-96040 (Patent Literature 1) will be described with reference to FIGS. 12 and 13.

According to Patent Literature 1, storage encrypted data 22 (a control program 25 encrypted) which is encrypted using a storage cipher key, and a storage decryption key 23 (a key to decrypt the encrypted control program 22), are stored in a storage memory device 21 of a game machine 20 (S41). When operating the game machine 20 (YES in S42), the storage encrypted data 22 is decrypted using the storage decryption key 23, so the control program 25 is executed (S43). The encryption/decryption process is constituted by an asymmetric encryption system, and the cipher key and the decryption key are separate. With this structure, the key employed when encrypting the control program 25 is not stored in the game machine 20. This makes it difficult to falsify or tamper the control program 25.

According to Patent Literature 1, the storage encrypted data 22 stored in the storage memory device 21 of the game machine 20 is transferred, in the encrypted form, to a verification device 30. The storage encrypted data 22 is collated with collation data 32 stored in advance in the verification device 30, to verify whether it is authentic or not. In this case, Patent Literature 1 says as the control program is processed in the encrypted form, leak of the program content can also be prevented.

CITATION LIST

Patent Literature

Patent Literature 1: Japanese Patent Publication No. 2001-96040.

SUMMARY OF INVENTION

Technical Problem

As described above, in the case of FIGS. 8 to 11, the check code generating key, the cipher key, and decryption key are resident in or outside the electronic device 10. Therefore, if, for example, key information is extracted by scrapping the electronic device 10, or the key information stored outside the apparatus is leaked, the key information may be undesirably acquired by a third party, and be tampered or copied.

Regarding the description of Patent Literature 1 that "falsification/tampering of the control program is prevented if the encryption key is not stored in the game machine 20", tampering becomes possible if "the decryption key is modified together with the encrypted control program". Regarding tampering detection using the verification device 30, if verification data in the verification device 30 is modified to match the encrypted control data in the game machine 20, tampering detection is no longer possible.

It is an object of the present invention to provide an electronic device having an incorporated program or parameter, in which illegal modification and illegal extraction of the program or parameter are prevented effectively.

Solution to Problem

An electronic device of the present invention that executes a key-using process indicating a process using a key, includes
a physical quantity generation part that generates a physical quantity intrinsic to the electronic device and having a value which is different from one electronic device to another and different each time the physical quantity is generated,
a key generation part that generates the same key, based on the physical quantity generated by the physical quantity generation part, each time the key-using process is to be executed, immediately before the key-using process is started,
a key-using process execution part that executes the key-using process using the key generated by the key generation part, and
a key deletion part that deletes the key generated by the key generation part, each time the key-using process is ended.
The key-using process execution part includes
a keyed hash value generation part that executes, as the key-using process, a keyed hash value generation process of generating a keyed hash value of information which is to be used for a predetermined process and specified in advance, by using the key generated by the key generation part,
a check code storage part that stores a keyed hash value generated in the past by the keyed hash value generation part, as a check code, and
a comparison part that checks, by comparison, whether the check code stored in the check code storage part coincides with a keyed hash value which is generated in a current keyed hash value generation process of the keyed hash value generation part, and
the electronic device further includes a coincidence information execution part that executes the predetermined process using the information specified in advance, only when the comparison part judges that coincidence is established.
The key-using process execution part includes
an encryption processing part that executes, as the key-using process, an encryption process by using the key generated by the key generation part, and
a decryption processing part that decrypts, as the key-using process, data encrypted by the encryption processing part, by using the key generated by the key generation part.
The key generation part generates the key by using a physical unclonable function (PUF).

A key generation program of the invention causes a computer to function as;
a physical quantity generation part that generates a physical quantity intrinsic to the computer and having a value which is different from one computer to another and different each time the physical quantity is generated,
a key generation part that generates the same key, based on the physical quantity generated by the physical quantity generation part, each time a key-using process indicating a process using a key is to be executed, immediately before the key-using process is started,
a key-using process execution part that executes the key-using process using the key generated by the key generation part, and
a key deletion part that deletes the key generated by the key generation part, each time the key-using process is ended.

A key generation method of the present invention conducted by an electronic device that executes a key-using process indicating a process using a key, includes
generating, with a physical quantity generation part, a physical quantity intrinsic to the electronic device and having a value which is different from one electronic device to another and different each time the physical quantity is generated,
generating, with a key generation part, the same key, based on the physical quantity generated by the physical quantity generation part, each time the key-using process is to be executed, immediately before the key-using process is started,
executing, with a key-using process execution part, the key-using process using the key generated by the key generation part, and
deleting, with a key deletion part, the key generated by the key generation part, each time the key-using process is ended.

Advantageous Effects of Invention

The present invention can provide an electronic device in which illegal modification and illegal extraction of a stored program or parameter is prevented effectively.

DESCRIPTION OF EMBODIMENTS

Embodiment 1

Figure 1:
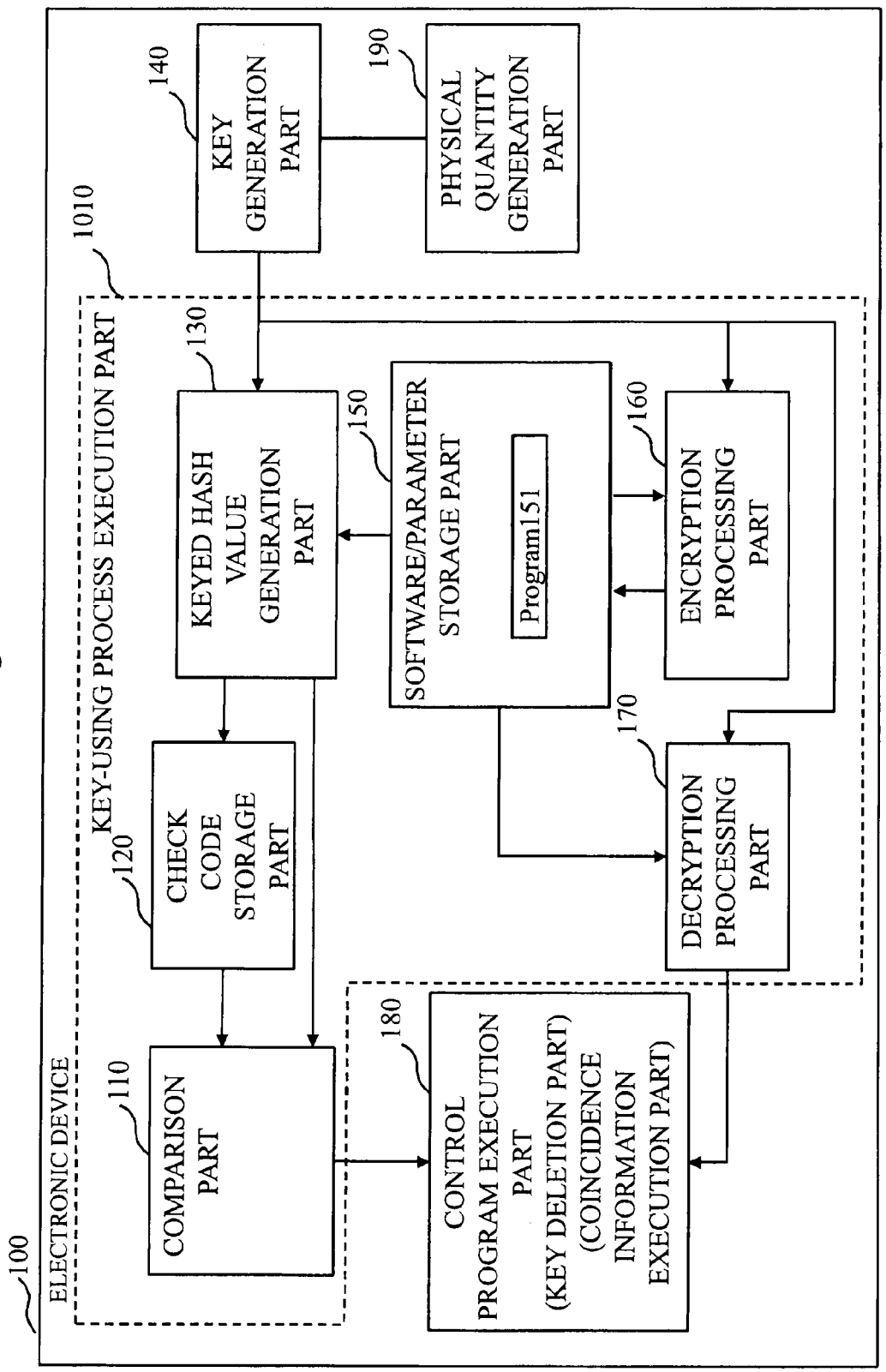
FIG. 1 is a block diagram of an electronic device of the first embodiment.

The first embodiment will be described with reference to FIGS. 1 to 6. FIG. 1 is a block diagram of an electronic device 100 of the first embodiment.

The electronic device 100 generates, on its own, a key to be used for any process that uses a key (to be referred to as a key-using process). The electronic device 100 generates the key immediately before the key-using process is executed, and deletes the key when execution of the key-using process is ended. The characteristic features of the electronic device 100 are particularly the following (a) and (b).

(a. Key Generation Based on Specific Physical Quantity)

The key to be generated by the electronic device 100 "is generated based on a physical quantity having a value which is different from one electronic device to another even when the electronic devices are manufactured in the same manner, and different each time the physical quantity is generated, not only from one electronic device to another, but also for the same, specific electronic device. The key is generated as a value which is different among electronic devices, but intrinsic to the same, specific electronic device each time the key is generated (this value is the same each time the key is generated)". More specifically, the first characteristic feature resides in that, based on a physical quantity intrinsic to an individual electronic device, a key is generated which is different from a key generated by another electronic device and intrinsic to this individual electronic device. Every time a key is generated for the same, specific electronic device, the same key is generated.

(b. Generation and Deletion of Key)

The second characteristic feature resides in that "the key is not stored in the electronic device or another device. Every time a key-using process is to be executed in the electronic device 100, the key is generated immediately before the process, and is deleted every time the key-using process is ended". In other words, the key exists in the electronic device only during the key-using process, and does not exist elsewhere.

The feature (a) can be implemented by, e.g., a PUF (Physical Uncionalbe Function) indicated in a literature P. Paillier and I. Verbauwhede (Eds.): CHES 2007, LNCS4727, pp 63-80, 2007, "FPGA Intrinsic PUFs and Their Use for IP Protection".

According to the features (a) and (b), the key does not exist outside the electronic device, and exists in the electronic device only during a short period of time. Hence, key information leak when the electronic device is disassembled becomes very difficult, and data tampering due to leak of the key information held outside the electronic device becomes very difficult.

Referring to FIG. 1, the electronic device 100 is provided with a key generation part 140, a control program execution part 180, a physical quantity generation part 190, and a key-using process execution part 1010. The key-using process execution part 1010 is provided with a comparison part 110, a check code storage part 120, a keyed hash value generation part 130, a software/parameter storage part 150, an encryption processing part 160, and a decryption processing part 170.

(1) The physical quantity generation part 190 generates a physical quantity intrinsic to the electronic device and having a value which is different from one electronic device 100 to another and different each time the physical quantity is generated. Examples of such physical quantity include, e.g., a signal generated by a ring oscillator (to be described later), an operation frequency or oscillation frequency of a specific circuit, and the state of an SRAM (Static Random Access Memory) (storage state 0 or 1) at the time the power supply is turned on. In this case, the physical quantity generation part 190 is an oscillator, specific circuit, or SRAM.

(2) Each time the key-using process is to be executed, the key generation part 140 generates the same key immediately before the key-using process is started, based on the physical quantity generated by the physical quantity generation part 190. More specifically, each time the key-using process is to be executed, the key generation part 140 generates the same key, immediately before the start of the key-using process, by using the physical quantity generated by the physical quantity generation part 190.

(3) Using the key generated by the key generation part 140, the key-using process execution part 1010 executes the key-using process.

(4) Each time the key-using process is ended, the control program execution part 180 deletes the key generated by the key generation part 140, and executes other processes.

Figure 2:
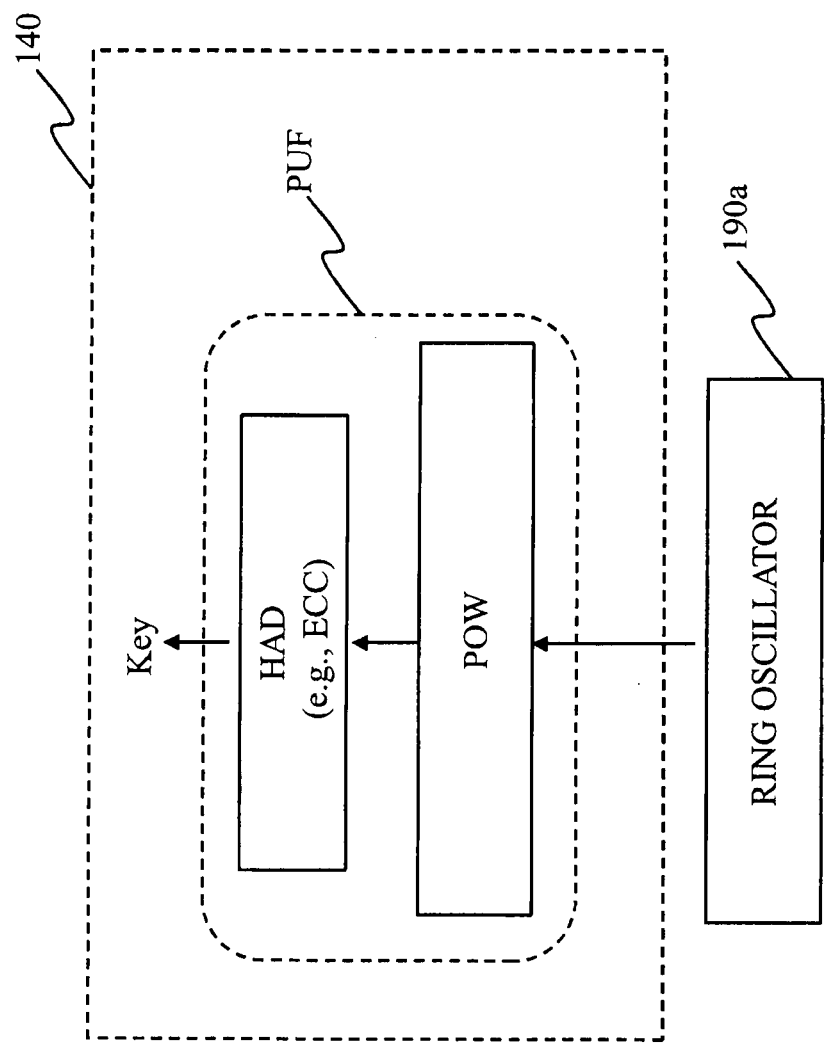
FIG. 2 is a diagram showing key generation by a key generation part 140 of the first embodiment.
Figure 3:
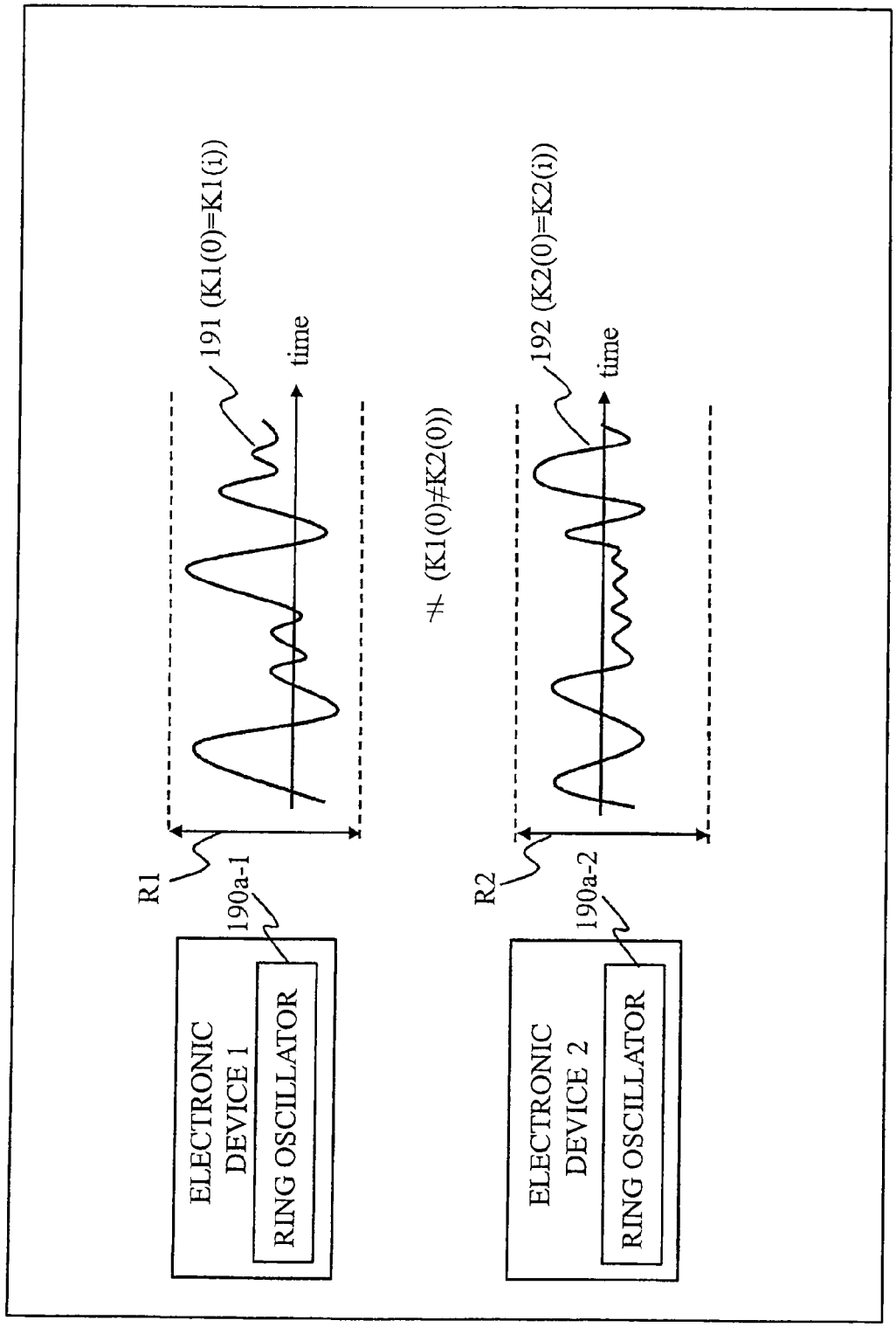
FIG. 3 shows signals generated by a ring oscillator 190a of the first embodiment.

FIG. 2 is a diagram showing an example of key generation by the key generation part 140. Referring to FIG. 2, a ring oscillator 190a is an example of the physical quantity generation part 190. FIG. 3 shows the relation between the signal (physical quantity) generated by the ring oscillator 190a and the key generated based on the signal. The ring oscillator (190a-1) of an electronic device 1 generates a signal 191, and the ring oscillator (190a-2) of an electronic device 2 generates a signal 192.

(1) The signal generated by the ring oscillator differs from one electronic device to another.

(2) The value of the signal differs each time the signal is generated, even if the signal is generated for the same electronic device. For example, as indicated by the signal 191, the value of the signal changes in the electronic device 1 (the same electronic device) along with the time.

(3) Note that the signals 191 and 192 generated by the ring oscillators (190a-1, 190a-2) have values falling within predetermined ranges R1 and R2, respectively.

Regarding the electronic device 1, each time the key-using process is to be executed, the key generation part 140 generates the same key K1 immediately before the key-using process is executed, based on the signal 191 generated by the ring oscillator (190a-1). More specifically, assuming that, of the respective keys generated for each key-using process based on the signal 191, a key generated the first is defined as the key K1(0) and a key generated after that is defined as a key K1 (i)

(i=1, 2, ... ), the keys generated for the respective key-using processes are the same. In other words, K1(0)=K1 (i)(i=1, 2, ... )

If the key generated for the electronic device 2 is defined as the key K2,

K2(0)=K2 (i)(i=1, 2, ... )

similarly holds for the electronic device 2 as well.

For different electronic devices, different keys exist even if the electronic devices are of the same product type.

Namely,

K1 (0)≠K2 (0)

holds for the electronic devices 1 and 2.

As shown in FIG. 2, the key generation part 140 generates the key based on the signal of the ring oscillator (190*a*-1) which is the physical quantity generation part 190. For example, based on the signal 191, the key generation part 140 generates the key in accordance with the POW (Physical One way function) and the HAD (Helper Data Algorithm), as shown in FIG. 2. The POW and the HAD constitute the PUF. An example of the HAD is an ECC (Error Correcting Code).

Tampering detection using the key generation function of the electronic device 100 will be described with reference to FIG. 4.

(Generation of Keyed Hash Value)

Figure 4:
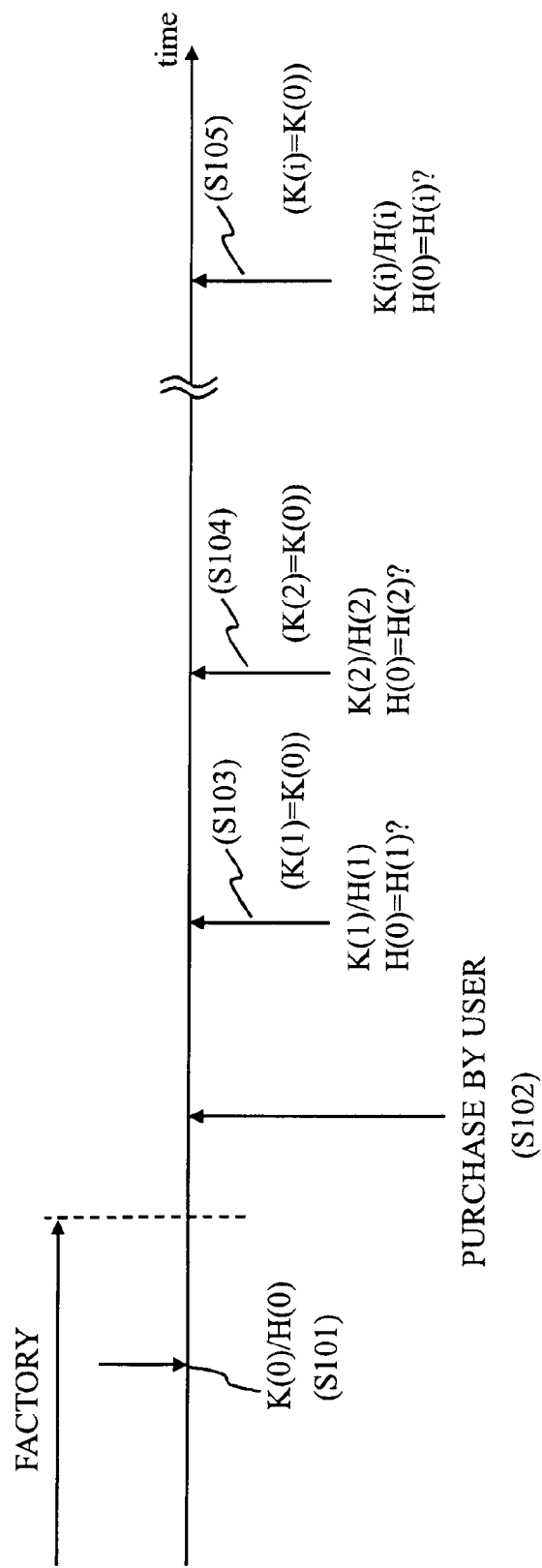
FIG. 4 is an illustration that explains generation of a keyed hash value of the first embodiment.

FIG. 4 shows a case wherein a keyed hash value is calculated in advance, stored as the check code, and compared with a keyed hash value recalculated, to detect tampering. Although the case shown in FIG. 4 is almost the same as the case described with reference to FIGS. 8 to 11, the former is different in that, in FIG. 4, the electronic device 100 executes tampering detection based on the features (a) and (b) described above. Information as the target of tampering detection is information such as a program 151 or a parameter stored in the software/parameter storage part 150. In the following explanation, the program 151 is the target of tampering detection.

(S101)

In S101, regarding the electronic device 100, a keyed hash value H (0) of the program 151 stored in the software/parameter storage part 150 is generated at the factory, and is stored in the check code storage part 120. More specifically, first, the program 151 is stored in the software/parameter storage part 150. Immediately before a keyed hash value generation process (an example of the key-using process), the key generation part 140 generates a key K (0) based on the physical quantity generated by the physical quantity generation part 190. The keyed hash value generation part 130 generates the keyed hash value H (0) of the program 151 using the key K (0), and stores the keyed hash value H (0) in the check code storage part 120 as a check code. When the generation process of the keyed hash value H (0) is ended, the control program execution part 180 (an example of a key deletion part) deletes the key K (0).

(S102)

Assume that the user purchases the electronic device 100 in S102.

(S103)

In S103, the generation process of the keyed hash value is executed. The generation process of the keyed hash value is conducted when execution of the program 151 is requested. In this case, immediately before the start of the generation process of the keyed hash value, the key generation part 140 generates a key K (1). The key K (1) is the same as the key K (0) generated in S101 (K (0)=K (1)). In the same manner as in S101, the keyed hash value generation part 130 generates a keyed hash value H (1) of the program 151 by using the key K (1). The comparison part 110 compares the keyed hash value H (1) with the keyed hash value H (0) stored in the check code storage part 120, and checks whether the two hash values coincide. If the comparison part 110 judges that the two hash values coincide, the control program execution part 180 (an example of a coincidence information execution part) executes the process for the program 151. If the comparison part 110 judges that the two hash values do not coincide, the control program execution part 180 produces an alarm (alarm display, alarm sound, and the like), and does not execute the program 151. When the generation process of the keyed hash value H (1) is ended, the control program execution part 180 (key deletion part) deletes the key K (1).

After that, each time execution of the program 151 is requested, the same process as that of S103 is executed, as indicated by S104 and S105 of FIG. 4. More specifically, the key generation part 140 generates a key for each key-using process, and the keyed hash value generation part 130 generates a keyed hash value from the program 151 using the generated key. The comparison part 110 compares the keyed hash value H (0) stored in the check code storage part 120 with a generated keyed hash value H (i) (i=2, 3, ... ). If the comparison result exhibits coincidence, the control program execution part 180 executes the program 151; if not, the control program execution part 180 does not execute the program 151. When the generation process of the keyed hash value of this key-using process is ended, the control program execution part 180 deletes the key generated for this key-using process.

(Encryption/Decryption Process)

Leak prevention and copy prevention of the content of the program and parameter, using an encryption process and a decryption process, will be explained with reference to FIGS. 5 and 6. The target of encryption and decryption will be explained by referring to the program 151 as an example.

The control program and parameters are encrypted and stored. In operation, the encrypted control program and parameters are decrypted, and are executed. In this respect, the present invention is the same as the case described in Background Art. The difference resides in the key generation method and in that the key is not held in the electronic device 100 or in an external device, as with the case of calculation of a keyed hash value.

Figure 5:
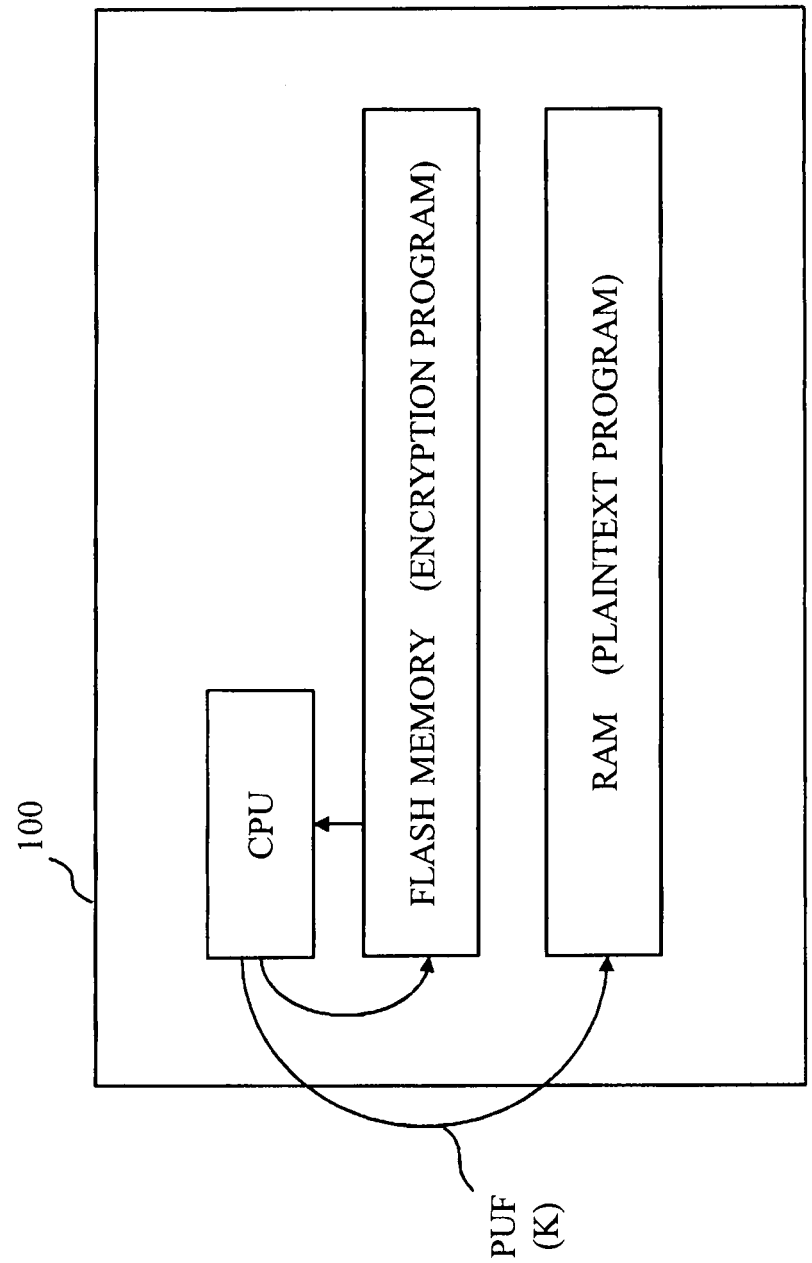
FIG. 5 is a diagram showing how a plaintext program and an encryption program are stored in the first embodiment.

FIG. 5 shows how a plaintext program and an encryption program are stored. As the software/parameter storage part 150, for example, a flash memory is used. As the decryption processing part 170, for example, a RAM is used. As shown in FIG. 5, an encryption program resides in the nonvolatile flash memory. When execution of the program is requested, the encryption program is read from the flash memory, decrypted, and executed. The decrypted program is deleted once the process is ended. An explanation will be made hereinafter by referring to FIG. 6.

(S201)

Figure 6:
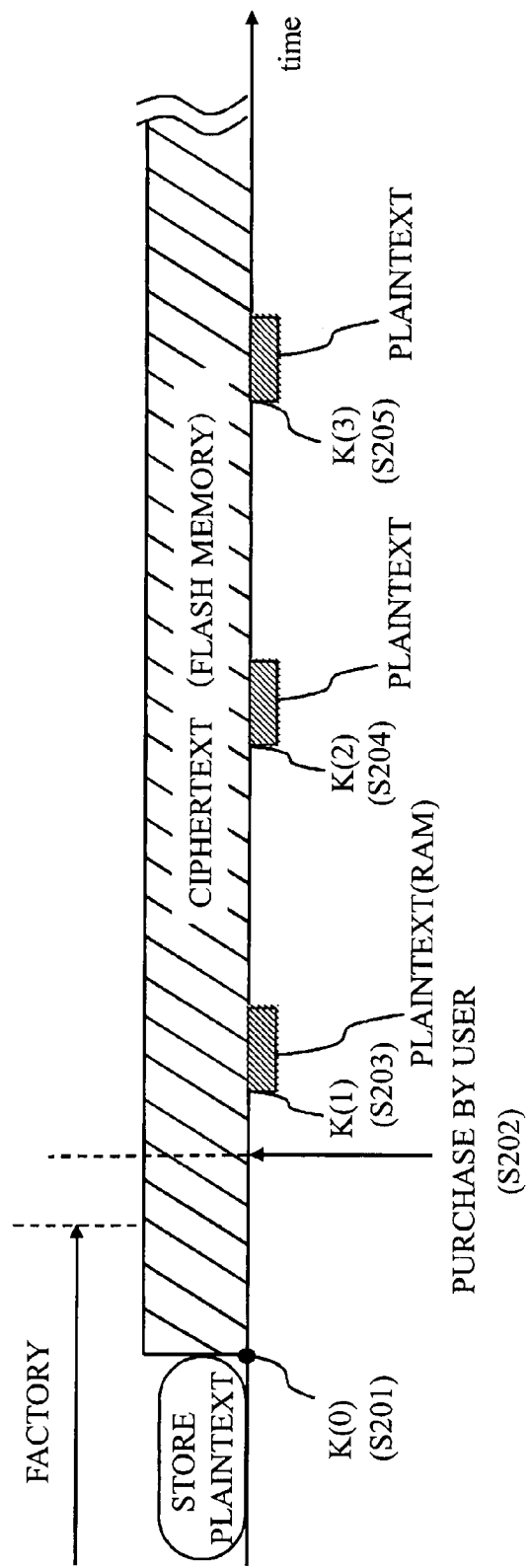
FIG. 6 is an illustration that explains a program encryption/decryption process of the first embodiment.

FIG. 6 is an illustration that explains a program encryption/decryption process. First, in S201, in the electronic device 100, the plaintext program 151 is stored in the software/parameter storage part 150 at the factory. When the plaintext program 151 is stored, the encryption processing part 160 executes the encryption process (key-using process) for the program 151. Immediately before the encryption process for the program 151, the key generation part 140 generates the key K (0) based on the physical quantity generated by the physical quantity generation part 190. The encryption processing part 160 encrypts the program 151 by using the key K (0), and stores the encrypted program 151 in the software/parameter storage part 150. The encrypted program 151 is decrypted by the decryption processing part 170 when the electronic device 100 is shifted to the next use state (for example, the power supply is turned on).

(S202)

In step S202, assume that the user has purchased the electronic device 100.

(S203)

In S203, when the user turns on the power supply of the electronic device 100, the decryption processing part 170 reads the encrypted program 151 stored in the software/parameter storage part 150, and executes the decryption process (key-using process). Immediately before the decryption process for the program 151, the key generation part 140 generates the key K (1) based on the physical quantity generated by the physical quantity generation part 190. The decryption processing part 170 decrypts the program 151 by using the key K (1), and transmits the decrypted program 151 to the control program execution part 180. When the decryption process by the decryption processing part 170 is ended, the control program execution part 180 deletes the generated key K (1). Also, the control program execution part 180 executes the program 151 received from the decryption processing part 170, and deletes the program 151 when the process is ended.

Likewise, in step S204, S205, or the subsequent step, each time the power supply is turned on, the key K (2), K (3), or the like is generated (S204, S205). When the decryption process of each key-using process is ended, the key K (2), K (3), or the like is deleted.

In the first embodiment, the PUP is implemented in the key generation part 140 of the electronic device 100. Thus, a key intrinsic to each individual electronic device can be generated from the physical quantity which is different from one electronic device to another, and the same key can always be generated.

(1) The key need not be held in the electronic device or external device.

(2) Even if a plurality of electronic devices that are of the same type (the same products with different serial numbers) exist, different keys are generated for the respective electronic devices (respective serial numbers).

(3) One electronic device generates the same key for every key-using process. Because of the above reasons, a process using a key can be performed in the same manner as in the conventional case, and the possibility of key draining decreases greatly.

In the first embodiment described above, the following electronic device has been explained. Namely, an electronic device which controls and sets operation by incorporated software or parameter has been explained, the electronic device having:

a function of generating a check code by calculating a keyed hash value from software and a parameter in advance;

a function of storing the check code; and a function of recalculating a keyed hash value from the software or the parameter at the boot, or at an arbitrary timing, and comparing the recalculated keyed hash value with the stored check code, thereby detecting tampering.

In this electronic device, the key used when calculating the keyed hash value is generated based on a physical quantity having a value which is different from one electronic device to another even when the electronic devices are manufactured in the same manner, and different each time the physical quantity is generated, not only from one electronic device to another, but also for the same, specific electronic device, as a value which is different among electronic devices of the same type, but intrinsic to the same, specific electronic device.

The key is not stored in the electronic device, but is generated by the electronic device for each key-using process when the electronic device is booted, or at an arbitrary timing.

In the first embodiment described above, the following electronic device has been explained. More specifically, an electronic device has been explained which includes a function of encrypting incorporated software or parameter, a function of storing the encrypted software or parameter, and a function of decrypting the encrypted software or parameter when a process is to be performed.

As with the key used when calculating the keyed hash value, when encryption or decryption is to be performed, the key is generated based on a physical quantity having a value which is different from one electronic device to another even when the electronic devices are manufactured in the same manner, and different each time the physical quantity is generated, not only from one electronic device to another, but also for the same, specific electronic device, as a value which is different among electronic devices of the same type, but intrinsic to the same, specific electronic device.

The key is not stored in the electronic device, but is generated by the electronic device for each key-using process when the electronic device is booted, or at an arbitrary timing.

In the first embodiment, the following electronic device has been explained. More specifically, an electronic device has been explained which generates a key used for calculation of the keyed hash value, or a key used when performing an encryption process or decryption process, by using a PUF (Physical Unclonable Function).

Embodiment 2

The second embodiment will now be described with reference to FIG. 7. The second embodiment shows a case wherein the series of operations of the electronic device 100 is treated as a method, a program, or a computer-readable storage medium which stores the program.

In the first embodiment, the electronic device 100 has been described. The series of operations of the respective constituent elements ("parts") which are the constituent elements of the electronic device 100 of the first embodiment are related to each other. The series of operations can be treated as a method executed by the electronic device 100. If the series of operations is treated as a process to be executed by a computer, it can be treated as a program to be executed by the computer. The series of operations can also be treated as a computer-readable recording medium which stores the program.

Figure 7:
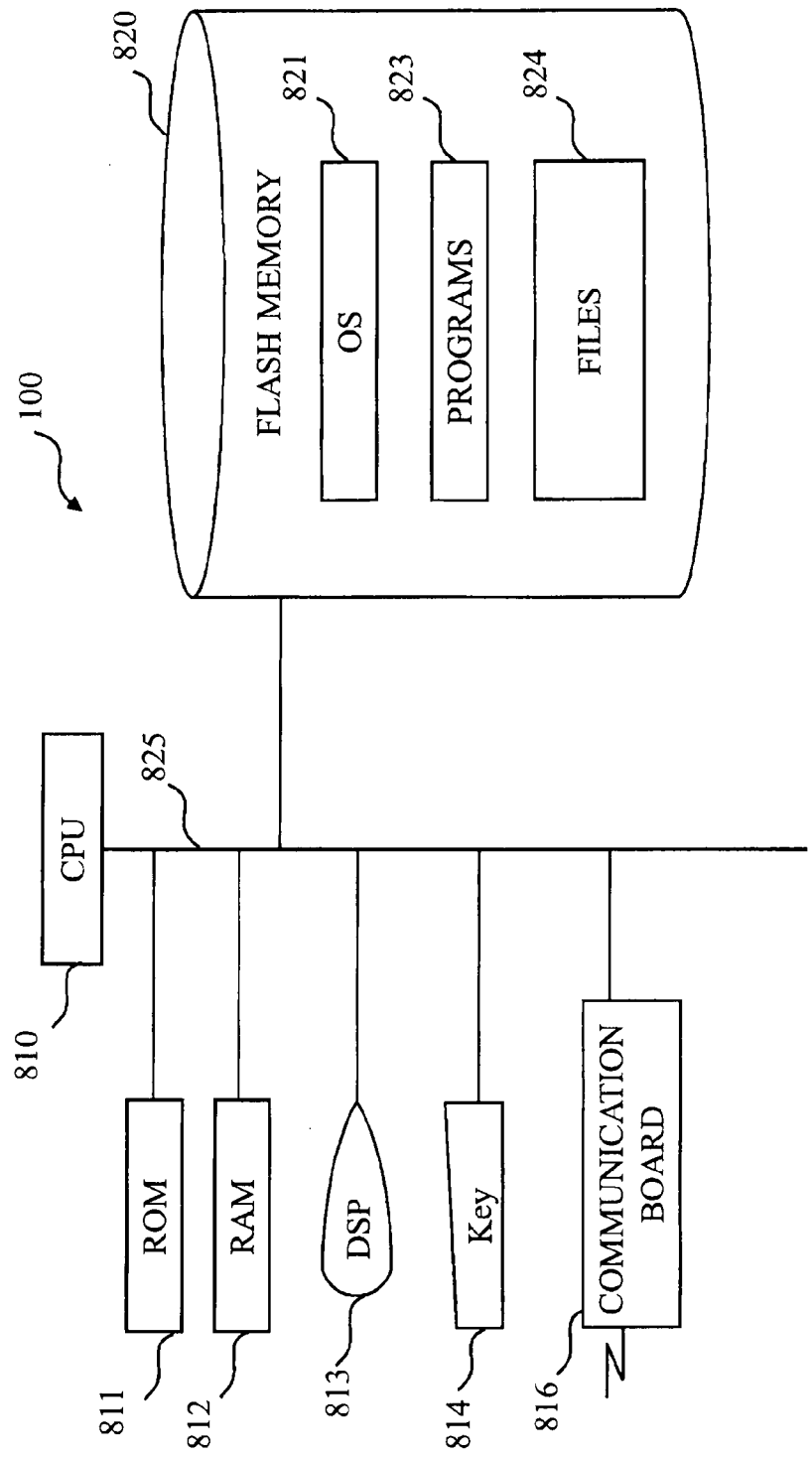
FIG. 7 is a diagram showing the hardware configuration of an electronic device of the second embodiment.
Figure 8:
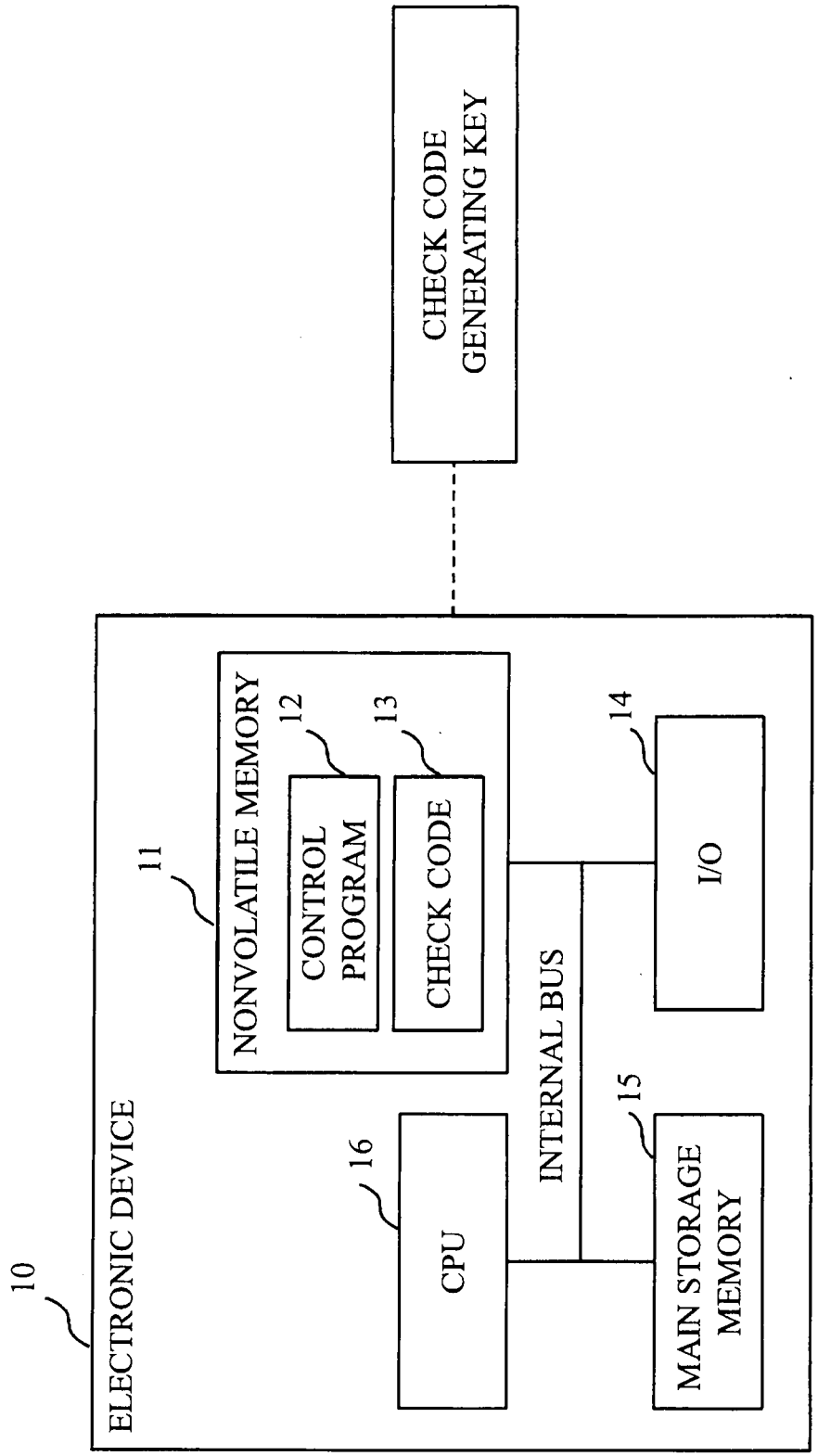
FIG. 8 is a diagram showing a prior art.
Figure 9:
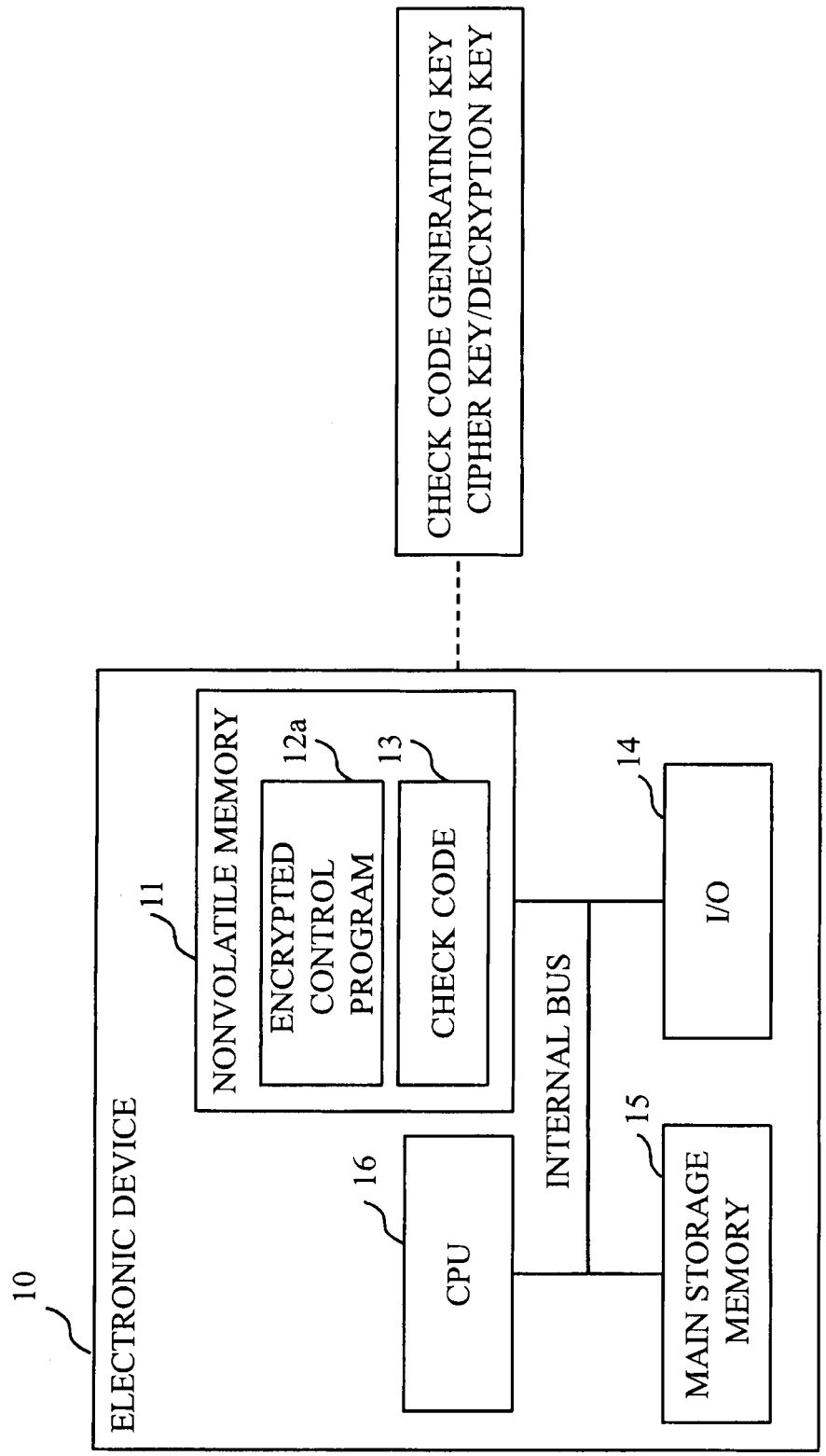
FIG. 9 is a diagram showing the prior art.
Figure 10:
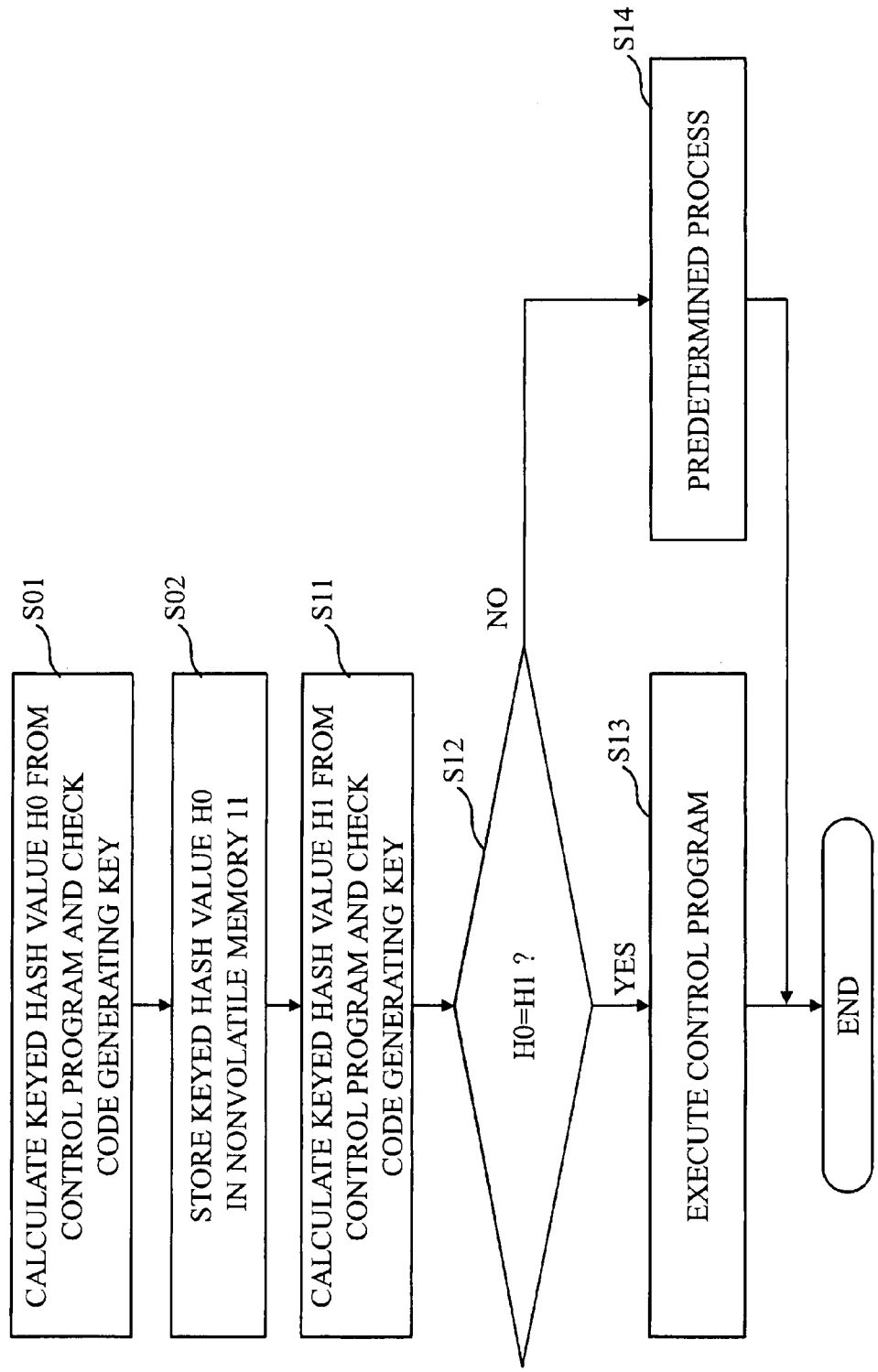
FIG. 10 is a flowchart showing the prior art.
Figure 11:
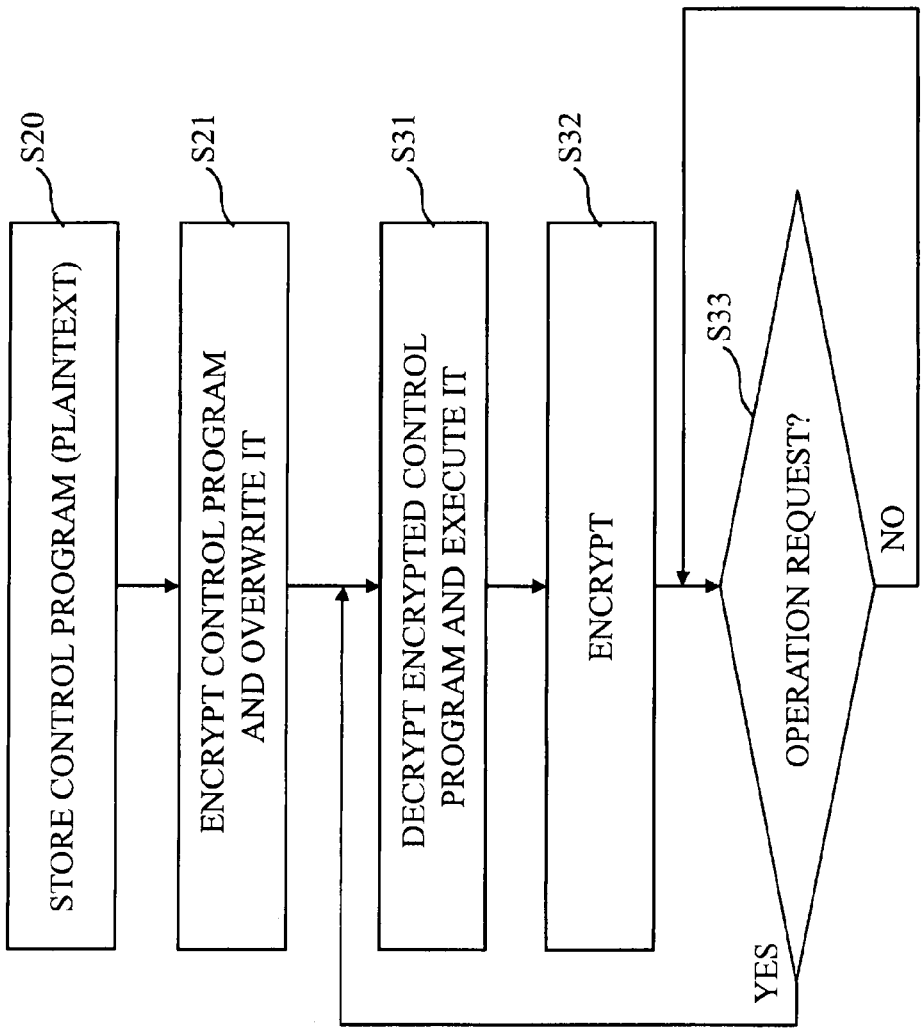
FIG. 11 is a flowchart showing the prior art.
Figure 12:
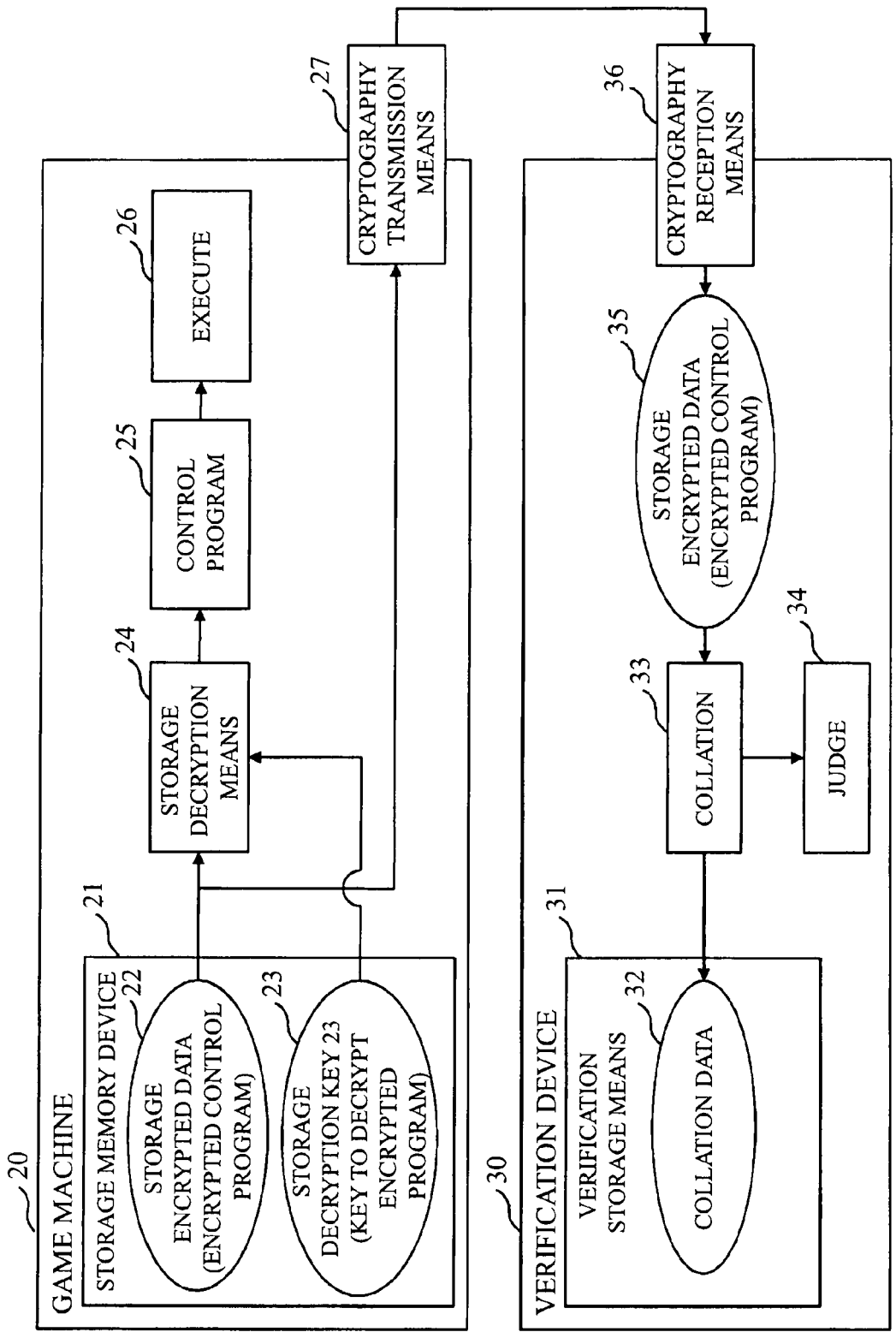
FIG. 12 is a diagram showing a prior art.
Figure 13:
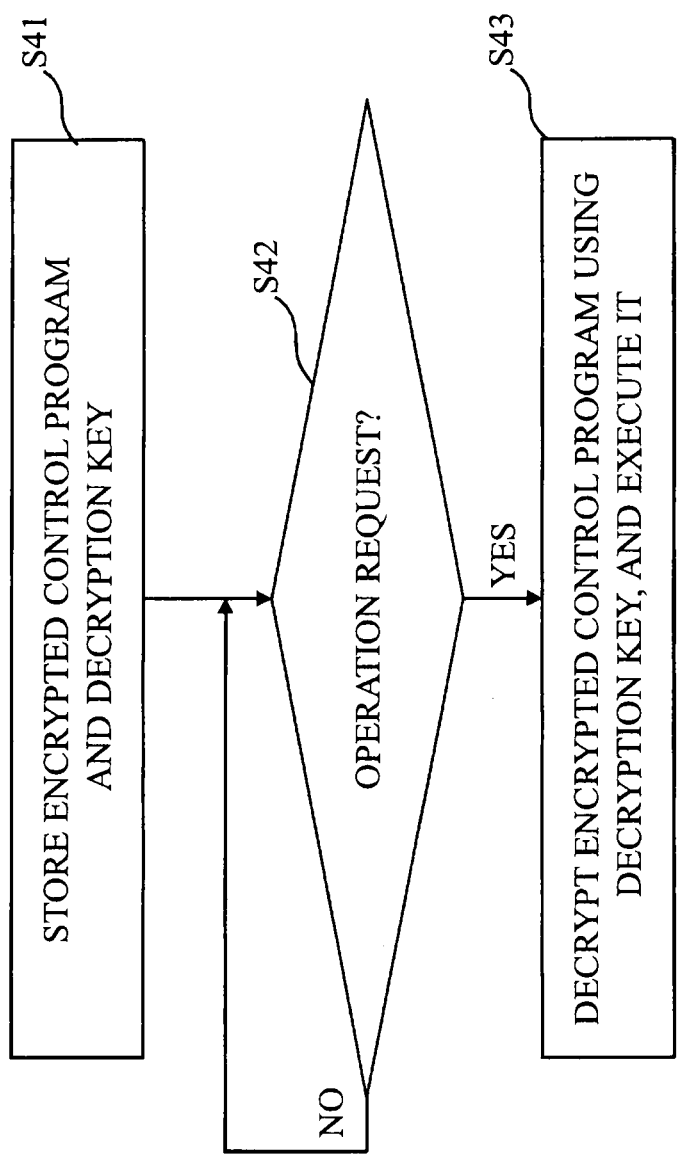
FIG. 13 is a flowchart showing the prior art.

FIG. 7 shows an example of the hardware resources of the electronic device 100 which is a computer. Referring to FIG. 7, the electronic device 100 comprises a CPU 810 (Central Processing Unit) that executes programs. The CPU 810 is connected to a ROM 811 (Read Only Memory), a RAM 812 (Random Access Memory), a display device 813, manipulation keys 814, a communication board 816, a flash memory 820, and the like via a bus 825, and controls these hardware devices. In place of the flash memory, a storage device such as a magnetic disk device, an optical disk device, or a memory card read/write device may be employed.

The RAM 812 is an example of a volatile memory. The storage media such as the ROM 811 and flash memory 820 are examples of a nonvolatile memory. These devices are examples of the storage device or storage part.

The communication board 816 communicates with other devices.

The flash memory 820 stores an operating system 821 (OS), programs 823, and files 824. The CPU 810 and the operation system 821 execute each program of the programs 823.

The programs 823 include a program that executes a function described as a "part" in the first embodiment. The program is read and executed by the CPU 810.

The files 824 store the physical unclonable function (PUF) described in the above embodiment, as well as information, data, signal values, variable values, and parameters described as the "judgment result", "generation result", "extraction result", and "processing result", as the items of "files" and "databases". The "files" and "databases" are stored in a recording medium such as a disk or memory. The information, data, signal values, variable values, and parameters stored in the storage medium such as the disk or memory are read out to the main memory or cache memory by the CPU 810 through a read/write circuit, and are used for the operations of the CPU such as extraction, search, look-up, comparison, computation, calculation, process, output, and display. During the operations of the CPU including extraction, search, look-up, comparison, computation, calculation, process, output, and display, the information, data, signal values, variable values, and parameters are temporarily stored in the main memory, cache memory, or buffer memory.

The "part" described in the first embodiment may be a "circuit", "device", "unit", or "means"; or a "step", "procedure", or "process". Namely, the "part" may be realized as the firmware stored in the ROM 811. Alternatively, the "part" may be practiced by only software; by only hardware such as an element, a device, a substrate, or a wiring line; by a combination of software and hardware; or furthermore by a combination of software, hardware, and firmware. The program is read by the CPU 810 and executed by the CPU 810. In other words, a program causes the computer to function as a "part" described in the above explanation.

Reference Signs List

100 electronic device, 110 comparison part, 120 check code storage part, 130 keyed hash value generation part, 140 key generation part, 150 software/parameter storage part, 160 encryption processing part, 170 decryption processing part, 180 control program execution part, 190 physical quantity generation part, 190a ring oscillator, 1010 key-using process execution part

The invention claimed is:

1. An electronic device that executes a key-using process indicating a process using a key, the electronic device comprising:
 a physical quantity generator that generates a physical quantity intrinsic to the electronic device and having a value which is different from one electronic device to another and different each time the physical quantity is generated;
 a key generator that generates the same key, based on the physical quantity generated by the physical quantity generator, each time the key-using process is to be executed, immediately before the key-using process is started;
 a key-using process executor that executes the key-using process using the key generated by the key generator; and
 a key deletor that deletes the key generated by the key generator, each time the key-using process is ended, wherein the key-using process executor includes
 a keyed hash value generator that executes, as the key-using process, a keyed hash value generation process of generating a keyed hash value of information which is to be used for a predetermined process and specified in advance, by using the key generated by the key generator,
 a check code storage that stores a keyed hash value generated in the past by the keyed hash value generator, as a check code, and
 a comparer that checks, by comparison, whether the check code stored in the check code storage coincides with a keyed hash value which is generated in a current keyed hash value generation process of the keyed hash value generator,
 the electronic device further comprising a coincidence information executor that executes the predetermined process using the information which is to be used for the predetermined process and specified in advance, only when the comparer judges that coincidence is established.

2. The electronic device according to claim 1, wherein the key-using process executor includes
 an encryption processor that executes, as the key-using process, an encryption process by using the key generated by the key generator, and
 a decryption processor that decrypts, as the key-using process, data encrypted by the encryption processor, by using the key generated by the key generator.

3. The electronic device according to claim 1, wherein the key generator generates the key by using a physical unclonable function (PUF).

4. A non-transitory computer-readable recording medium storing a generation program that causes a computer to function as:
 a physical quantity generator that generates a physical quantity intrinsic to the computer and having a value which is different from one computer to another and different each time the physical quantity is generated;
 a key generator that generates the same key, based on the physical quantity generated by the physical quantity generator, each time a key-using process indicating a process using a key is to be executed, immediately before the key-using process is started;
 a key-using process executor that executes the key-using process using the key generated by the key generator; and
 a key deletor that deletes the key generated by the key generator, each time the key-using process is ended; and
 further causes the computer to function as
 a keyed hash value generator that executes, as the key-using process, a keyed hash value generation process of generating a keyed hash value of information which is to be used for a predetermined process and specified in advance, by using the key generated by the key generator;
 a check code storage that stores a keyed hash value generated in the past by the keyed hash value generator, as a check code;
 a comparer that checks, by comparison, whether the check code stored in the check code storage coincides with a keyed hash value which is generated in a current keyed hash value generation process of the keyed hash value generator; and
 a coincidence information executor that executes the predetermined process using the information which is to be used for the predetermined process and specified in advance, only when the comparer judges that coincidence is established.

5. A key generation method conducted by an electronic device that executes a key-using process indicating a process using a key, the key generation method comprising:

generating, with a physical quantity generator, a physical quantity intrinsic to the electronic device and having a value which is different from one electronic device to another and different each time the physical quantity is generated;

generating, with a key generator, the same key, based on the physical quantity generated by the physical quantity generator, each time the key-using process is to be executed, immediately before the key-using process is started;

executing, with a key-using process executor, the key-using process using the key generated by the key generator;

deleting, with a key deletor, the key generated by the key generator, each time the key-using process is ended;

executing, with a keyed hash value generator, as the key-using process, a keyed hash value generation process of generating a keyed hash value of information which is to be used for a predetermined process and specified in advance, by using the key generated by the key generator;

storing, with a check code storage, a keyed hash value generated in the past by the keyed hash value generator, as a check code;

checking, with a comparer, by comparison, whether the check code stored in the check code storage coincides with a keyed hash value which is generated in a current keyed hash value generation process of the keyed hash value generator; and executing, with a coincidence information executor, the predetermined process using the information which is to be used for the predetermined process and specified in advance, only when the comparer judges that coincidence is established.

6. The electronic device according to claim 1, wherein the physical quantity intrinsic to the electronic device is a signal generated by a ring oscillator.

7. The electronic device according to claim 1, wherein the physical quantity intrinsic to the electronic device is either an operation frequency or an oscillation frequency of a specific circuit in the electronic device.

8. The electronic device according to claim 1, wherein the physical quantity intrinsic to the electronic device is based on a state of a static random access memory (SRAM) when a power supply supplying power to the electronic device is turned on.

* * * * *